US012663121B2

(12) United States Patent
Park et al.

(10) Patent No.: US 12,663,121 B2
(45) Date of Patent: Jun. 23, 2026

(54) COUPLING DEVICE FOR PRESSURE VESSEL

(71) Applicants: Hyundai Motor Company, Seoul (KR); Kia Corporation, Seoul (KR)

(72) Inventors: Seong Nyeong Park, Hwaseong-si (KR); Do Hyeon Kim, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/799,220

(22) Filed: Aug. 9, 2024

(65) Prior Publication Data

US 2025/0320970 A1 Oct. 16, 2025

(30) Foreign Application Priority Data

Apr. 11, 2024 (KR) ........................ 10-2024-0048807

(51) Int. Cl.
*F17C 13/08* (2006.01)

(52) U.S. Cl.
CPC .... *F17C 13/084* (2013.01); *F17C 2201/0119* (2013.01); *F17C 2205/0146* (2013.01); *F17C 2205/0305* (2013.01); *F17C 2205/037* (2013.01); *F17C 2221/012* (2013.01); *F17C 2270/0105* (2013.01); *F17C 2270/0168* (2013.01); *F17C 2270/0184* (2013.01); *F17C 2270/0189* (2013.01)

(58) Field of Classification Search
CPC ...... F17C 2205/0305; F17C 2205/0142; F17C 2205/0146; F17C 2205/0134; F17C 2205/0136; F17C 13/084; F17C 2205/037
See application file for complete search history.

(56) References Cited

U.S. PATENT DOCUMENTS

| | | | | |
|---|---|---|---|---|
| 4,832,376 | A * | 5/1989 | Sugao | F16L 41/12 285/133.11 |
| 9,206,946 | B2 * | 12/2015 | Mayr | F17C 13/002 |
| 11,933,455 | B2 * | 3/2024 | Icard | F17C 5/00 |
| 12,270,511 | B2 * | 4/2025 | Gutmann | F17C 13/084 |
| 2019/0049070 | A1 | 2/2019 | Sawai et al. | |
| 2023/0408040 | A1 | 12/2023 | Gutmann | |

FOREIGN PATENT DOCUMENTS

| | | | |
|---|---|---|---|
| DE | 102020128607 | A1 | 5/2022 |
| JP | 2019032034 | A | 2/2019 |
| KR | 20210147214 | A | 12/2021 |

* cited by examiner

*Primary Examiner* — Timothy L Maust
(74) *Attorney, Agent, or Firm* — Slater Matsil, LLP

(57) ABSTRACT

An embodiment coupling device includes a boss disposed at an end of a pressure vessel that is configured to store a target fluid, the boss including an inflow/outflow path through which the target fluid is introduced or discharged and a guide hole disposed in a reference direction orthogonal to a longitudinal direction of the pressure vessel and a manifold member configured to be inserted into the guide hole in the reference direction and including a manifold flow path configured to communicate with the inflow/outflow path.

20 Claims, 12 Drawing Sheets

COUPLING DEVICE FOR PRESSURE VESSEL

CROSS-REFERENCE TO RELATED APPLICATIONS

This application claims the benefit of Korean Patent Application No. 10-2024-0048807, filed on Apr. 11, 2024, which application is hereby incorporated herein by reference.

TECHNICAL FIELD

The present disclosure relates to a coupling device for a pressure vessel.

BACKGROUND

A hydrogen electric vehicle is configured to produce electricity by means of a chemical reaction between hydrogen and oxygen and to travel by driving a motor. More specifically, the hydrogen electric vehicle includes a hydrogen tank ($H_2$ tank) configured to store hydrogen ($H_2$), a fuel cell stack configured to produce electricity by means of an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

A TYPE 4 pressure vessel may be used as the hydrogen tank of the hydrogen electric vehicle. The TYPE 4 pressure vessel includes a liner (e.g., a nonmetallic material) including a cylindrical part and dome parts and a carbon fiber layer made by winding a carbon fiber composite material around an outer surface of the liner.

Meanwhile, recently, various attempts have been made to minimize a space occupied by the pressure vessel to improve spatial utilization and a degree of design freedom of the hydrogen vehicle.

In particular, recently, various attempts have been made to connect (couple) a plurality of pressure vessels each having a small diameter and a long length, instead of a single large pressure vessel (hydrogen tank), to a coupling device in parallel in a limited battery space to use a platform in common for a hydrogen vehicle and an electric vehicle.

However, in the related art, a first screw thread portion of the pressure vessel and a second screw thread portion of a nipple member need to be fastened by rotating the pressure vessel with a long length relative to the nipple member integrally fixed to the coupling device (manifold), which causes a problem in that a process of fastening the pressure vessel to the coupling device is cumbersome and inconvenient. Moreover, in the related art, it is difficult to dispose the first screw thread portion of the pressure vessel and the second screw thread portion of the nipple member coaxially (align the first screw thread portion and the second screw thread portion on a straight line), which causes a problem in that the first screw thread portion and the second screw thread portion are crushed during the process of fastening the first screw thread portion and the second screw thread portion.

In addition, in the related art, additional devices, such as a valve (e.g., a temperature-sensitive safety valve (thermal pressure relief device (TPRD)) or a shut-off valve) for adjusting a discharge of a fluid (e.g., hydrogen) stored in the pressure vessel needs to be fastened to an end of the pressure vessel based on a longitudinal direction of the pressure vessel separately from the coupling device, which causes a problem in that an overall length of the pressure vessel and an overall length of the coupling device are inevitably increased, and the spatial utilization and the degree of design freedom are degraded.

Therefore, recently, various studies have been conducted to improve the safety and reliability and simplify the process of fastening the pressure vessel, but the study results are still insufficient. Accordingly, there is a need to develop a technology to improve the safety and reliability and simplify the process of fastening the pressure vessel.

SUMMARY

The present disclosure relates to a coupling device for a pressure vessel. Particular embodiments relate to a coupling device for a pressure vessel that is capable of improving safety and reliability and simplifying a process of fastening the pressure vessel.

Embodiments of the present disclosure provide a pressure vessel capable of improving safety and reliability and simplifying a process of fastening the pressure vessel.

In particular, embodiments of the present disclosure minimize the number of sealing points (leak points) between a coupling device and the pressure vessel while simplifying a structure and fastening process.

Embodiments of the present disclosure also fasten the pressure vessel and the coupling device without rotating the pressure vessel relative to the coupling device.

Embodiments of the present disclosure also stably maintain an arrangement state and fastened state of the pressure vessel and improve the structural safety.

Embodiments of the present disclosure also minimize a fastening size between the pressure vessel and the coupling device and improve the spatial utilization and the degree of design freedom.

Embodiments of the present disclosure also minimize the loosening and withdrawal of the coupling device caused by vibration, impact, and the like.

The objects achievable by the embodiments of the present disclosure are not limited to the above-mentioned objects, but they also include objects or effects that may be understood from the solutions or embodiments described below.

An exemplary embodiment of the present disclosure provides a coupling device for a pressure vessel, the coupling device including a boss provided at an end of a pressure vessel configured to store a target fluid, the boss having an inflow/outflow path through which the target fluid is introduced or discharged and a guide hole provided in a reference direction orthogonal to a longitudinal direction of the pressure vessel, and a manifold member configured to be inserted into the guide hole in the reference direction and having a manifold flow path configured to communicate with the inflow/outflow path.

This is to simplify a process of fastening the pressure vessel to the coupling device and improve safety and reliability.

That is, in the related art, a first screw thread portion of a pressure vessel and a second screw thread portion of a nipple member need to be fastened by rotating the pressure vessel with a long length relative to the nipple member integrally fixed to a coupling device (manifold), which causes a problem in that a process of fastening the pressure vessel to the coupling device is cumbersome and inconvenient. Moreover, in the related art, it is difficult to dispose the first screw thread portion of the pressure vessel and the second screw thread portion of the nipple member coaxially (align the first screw thread portion and the second screw thread portion on a straight line), which causes a problem in that the first screw thread portion and the second screw thread portion are crushed during the process of fastening the first screw thread portion and the second screw thread portion.

In addition, in the related art, additional devices, such as a valve (e.g., a temperature-sensitive safety valve (thermal pressure relief device (TPRD)) or a shut-off valve), for adjusting a discharge of a fluid stored in the pressure vessel needs to be fastened to an end of the pressure vessel based on a longitudinal direction of the pressure vessel separately from the coupling device, which causes a problem in that an overall length of the pressure vessel and an overall length of the coupling device are inevitably increased, and the spatial utilization and the degree of design freedom are degraded.

In contrast, in embodiments of the present disclosure, the manifold member having the manifold flow path is sliding-coupled to the guide hole provided in the boss, such that a process of directly rotating the pressure vessel having a long length may be excluded. Therefore, it is possible to obtain an effect of improving the safety and reliability and simplifying the process of fastening the pressure vessel.

In addition, in embodiments of the present disclosure, it is possible to minimize the number of sealing points (leak points) between the manifold member and the pressure vessel. Therefore, it is possible to obtain an advantageous effect of minimizing a leak of the target fluid and simplifying the structure for sealing a connection portion between the manifold member and the pressure vessel.

The pressure vessel may have various structures having storage spaces therein.

According to an exemplary embodiment of the present disclosure, the pressure vessel may include a liner configured to store the target fluid, and the boss may be provided at an end of the liner.

According to an exemplary embodiment of the present disclosure, the liner may include a liner body portion configured to store the target fluid and a liner neck portion extending from an end of the liner body portion, and the inflow/outflow path may be defined along the inside of the liner neck portion.

According to an exemplary embodiment of the present disclosure, the liner may include a liner flange portion provided at an end of the liner neck portion and having a larger cross-sectional area than the liner neck portion, and the manifold member may be in close contact with the liner flange portion.

The manifold flow path may have various structures capable of being connected to and communicating with the inflow/outflow path in the state in which the manifold member is inserted into the guide hole.

According to an exemplary embodiment of the present disclosure, the manifold flow path may include a first flow path configured to communicate with the inflow/outflow path and provided in the longitudinal direction of the pressure vessel and a second flow path configured to communicate with the first flow path and provided in the reference direction.

According to an exemplary embodiment of the present disclosure, at least any one of two opposite ends of the second flow path may be exposed to an end of the manifold member based on a longitudinal direction of the manifold member.

According to an exemplary embodiment of the present disclosure, the guide hole may have a larger cross-sectional area than the manifold member.

Because the guide hole has a larger cross-sectional area than the manifold member as described above, it is possible to obtain an advantageous effect of ensuring that the manifold member is smoothly inserted into the guide hole and minimizing deformation of and damage to the first sealing member caused by interference with the manifold member.

According to an exemplary embodiment of the present disclosure, the coupling device for a pressure vessel may include a first sealing member provided between the boss and one surface of the manifold member that faces the inflow/outflow path.

According to an exemplary embodiment of the present disclosure, the first sealing member may include a sealing pattern having a closed-loop shape that surrounds a periphery of the inflow/outflow path.

Because the sealing pattern having a closed-loop shape is provided on the contact surface (sealing surface) of the first sealing member as described above, it is possible to obtain an advantageous effect of stably ensuring the sealing performance implemented by the first sealing member and minimizing a leak of the target fluid through the gap between the manifold member and the inflow/outflow path.

According to an exemplary embodiment of the present disclosure, the coupling device for a pressure vessel may include a restriction member configured to restrict a movement of the manifold member relative to the boss in the longitudinal direction of the pressure vessel.

The restriction member may have various structures capable of restricting a movement of the manifold member relative to the boss in the longitudinal direction of the pressure vessel.

According to an exemplary embodiment of the present disclosure, an accommodation portion may be provided at an end of the boss based on the longitudinal direction of the pressure vessel, and the restriction member may be accommodated in the accommodation portion so as to be able to press the manifold member.

The restriction implemented by the restriction member relative to the boss may be implemented in various ways in accordance with required conditions and design specifications.

According to an exemplary embodiment of the present disclosure, the coupling device for a pressure vessel may include a first screw thread portion provided on an inner peripheral surface of the accommodation portion and a second screw thread portion provided on an outer peripheral surface of the restriction member and configured to engage with the first screw thread portion, in which the restriction member restricts the manifold member using a fastening force between the first screw thread portion and the second screw thread portion.

According to an exemplary embodiment of the present disclosure, the coupling device for a pressure vessel may include a guide protrusion provided on one surface of the restriction member that faces the manifold member and a guide groove provided in the manifold member and configured to accommodate the guide protrusion.

According to an exemplary embodiment of the present disclosure, the guide protrusion may be provided in an axial direction of the pressure vessel.

As described above, in an embodiment of the present disclosure, the guide protrusion is provided in the axial direction of the pressure vessel (provided on the same line as an axis of the pressure vessel), such that the first flow path may be aligned (consistent) with the inflow/outflow path at the same time that the guide protrusion is accommodated in the guide groove.

According to an exemplary embodiment of the present disclosure, the coupling device for a pressure vessel may include a restriction portion configured to restrict a movement of the manifold member relative to the boss in an upward/downward direction orthogonal to the longitudinal direction of the pressure vessel.

The restriction portion may have various structures capable of restricting a movement of the manifold member relative to the boss in the upward/downward direction.

According to an exemplary embodiment of the present disclosure, the restriction portion may include a first guide surface configured to define one wall surface of the guide hole and a second guide surface provided to face the first guide surface and configured to define the other wall surface of the guide hole, and the manifold member may be supported between the first guide surface and the second guide surface so as to be rectilinearly movable in the longitudinal direction of the pressure vessel.

In particular, at least one of the first guide surface and the second guide surface may be defined as a flat surface. More particularly, the manifold member may include a first flat portion provided to be in surface contact with the first guide surface and a second flat portion provided to be in surface contact with the second guide surface.

According to an exemplary embodiment of the present disclosure, the coupling device for a pressure vessel may include a blocking member configured to block a gap between the guide hole and the manifold member in the longitudinal direction of the pressure vessel.

As described above, in an embodiment of the present disclosure, the gap between the guide hole and the manifold member is blocked by the blocking member. Therefore, it is possible to obtain an advantageous effect of minimizing contamination of and damage to the restriction member exposed through the gap.

According to an exemplary embodiment of the present disclosure, the coupling device for a pressure vessel may include a second sealing member provided between the manifold member and the restriction member.

According to an exemplary embodiment of the present disclosure, the coupling device for a pressure vessel may include a bonding layer provided between the boss and one surface of the manifold member that faces the inflow/outflow path.

DETAILED DESCRIPTION OF ILLUSTRATIVE EMBODIMENTS

Figure 1:
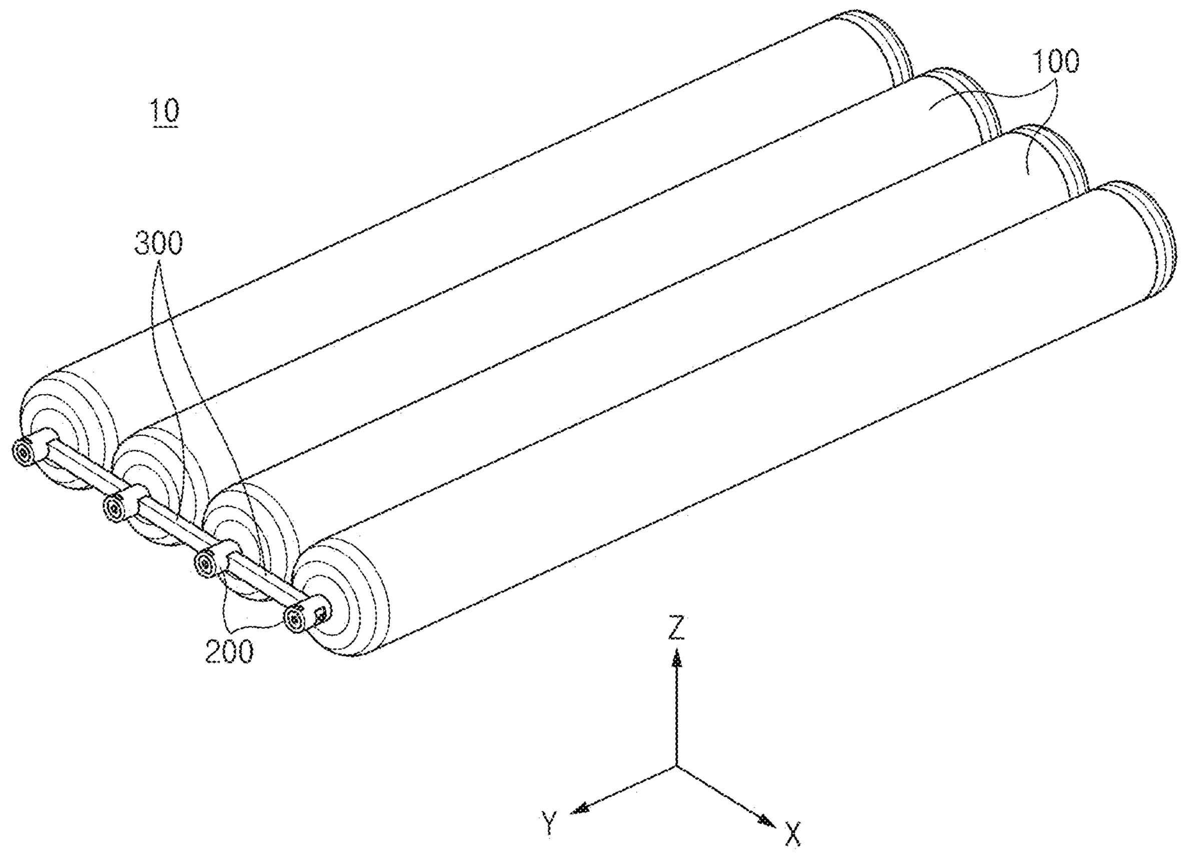
FIG. 1 is a view for explaining a coupling device for a pressure vessel according to an embodiment of the present disclosure.
Figure 2:
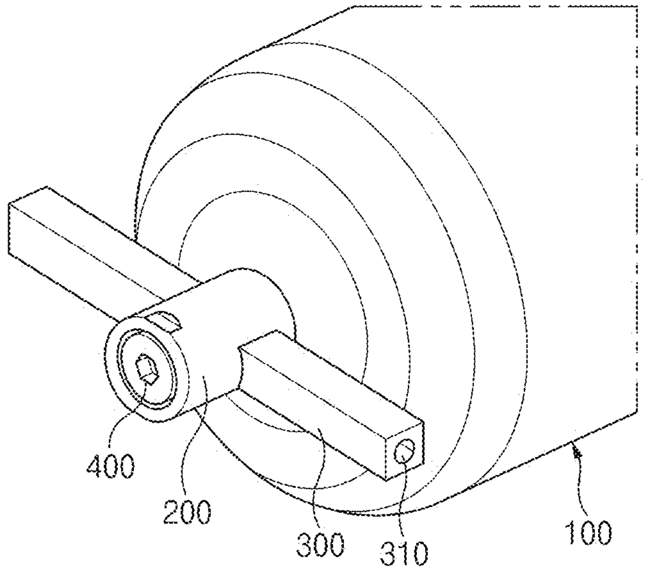
FIG. 2 is a view for explaining a boss and a manifold member of the coupling device for a pressure vessel according to an embodiment of the present disclosure.
Figure 3:
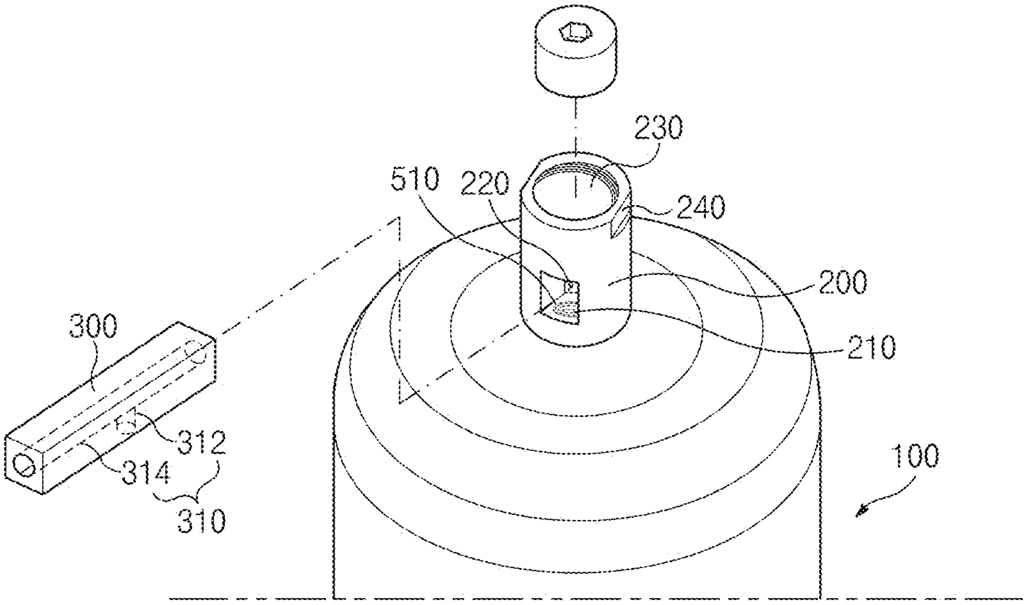
FIGS. 3 and 4 are views for explaining an inflow/outflow path and a manifold flow path of the coupling device for a pressure vessel according to an embodiment of the present disclosure.
Figure 4:
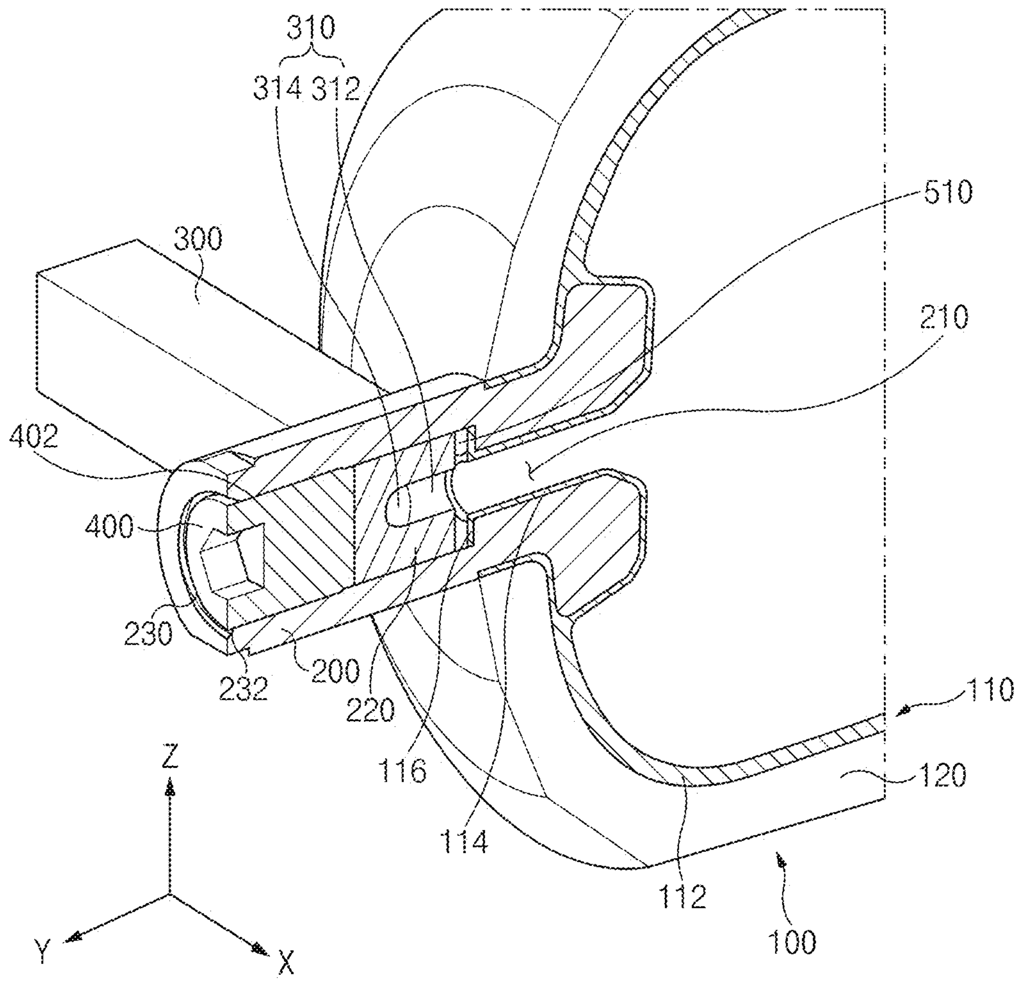

Hereinafter, exemplary embodiments of the present disclosure will be described in detail with reference to the accompanying drawings.

However, the technical spirit of the present disclosure is not limited to those embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as having the meaning which may be commonly understood by a person having ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected,' 'coupled,' or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

With reference to FIGS. 1 to 12, a coupling device 10 for a pressure vessel according to an embodiment of the present disclosure includes a boss 200 provided at an end of a pressure vessel 100 configured to store a target fluid, the boss 200 having an inflow/outflow path 210 through which the target fluid is introduced or discharged and a guide hole 220 provided in a reference direction orthogonal to a longitudinal direction of the pressure vessel 100, and a manifold member 300 configured to be inserted into the guide hole 220 in the reference direction and having a manifold flow path 310 configured to communicate with the inflow/outflow path 210.

For reference, the pressure vessel 100 may be used to store a high-pressure fluid (liquid or gas), and the present disclosure is not restricted or limited by the type and property of the fluid to be stored in the pressure vessel 100.

Hereinafter, an example will be described in which the pressure vessel 100 is used as a hydrogen tank for a hydrogen storage system applied to mobility vehicles such as various fuel cell electric vehicles (e.g., passenger vehicles or commercial vehicles), ships, and aircrafts to which a fuel cell stack may be applied.

With reference to FIGS. 1 to 5, the pressure vessel 100 may have various structures having storage spaces therein. The present disclosure is not restricted or limited by the structure and shape of the pressure vessel 100.

According to an exemplary embodiment of the present disclosure, the pressure vessel 100 may include a liner 110 configured to store the target fluid and a reinforcement layer 120 provided to surround a periphery of the liner 110.

The liner 110 may have a hollow structure having the storage space therein, and high-pressure hydrogen (target fluid) may be stored in the storage space.

The liner 110 may have various structures having storage spaces therein. The present disclosure is not restricted or limited by the structure and shape of the liner 110.

According to an exemplary embodiment of the present disclosure, the liner 110 may include a liner body portion 112 configured to store the target fluid, a liner neck portion 114 extending from an end of the liner body portion 112, and a liner flange portion 116 provided at an end of the liner neck portion 114 and having a larger cross-sectional area than the liner neck portion 114.

For example, the liner body portion 112 may include a cylinder portion (not illustrated) having a hollow cylindrical shape and side portions (not illustrated) having dome shapes and integrated with two opposite ends of the cylinder portion. The liner neck portion 114 may be provided at the end of the liner body portion 112 (an outermost peripheral end of the side portion) to define the inflow/outflow path 210 through which the target fluid (hydrogen) flows inward or outward (is introduced or discharged).

The liner flange portion 116 is provided at the end of the liner neck portion 114 to define a contact surface with which the manifold member 300 is in contact.

The liner flange portion 116 may have various structures having larger cross-sectional areas than the liner neck portion 114. The present disclosure is not restricted or limited by the structure and shape of the liner flange portion 116.

For example, the liner flange portion 116 may be integrated with an outermost peripheral end of the liner neck portion 114 so as to have an approximately hollow ring shape having a larger diameter than the liner neck portion 114. The liner flange portion 116 may be disposed in the guide hole 220 while facing the manifold member 300.

In particular, the contact surface of the flange portion may be defined as a flat surface so that the manifold member 300 (or a first sealing member) may be in close contact (surface contact) with the contact surface of the flange portion. According to another embodiment of the present disclosure, the contact surface of the flange portion may be provided as a curved surface.

The reinforcement layer 120 may be provided to ensure resistance (structural rigidity) against stress applied to the liner 110 and may surround the entire outer peripheral surface of the liner 110.

The reinforcement layer 120 may have various structures and may be made of various materials in accordance with required conditions and design specifications. The present disclosure is not restricted or limited by the structure and material of the reinforcement layer 120.

According to an exemplary embodiment of the present disclosure, the reinforcement layer 120 may be made of at least any one of reinforcing fiber, thermosetting resin, and thermoplastic resin.

Hereinafter, an example will be described in which the reinforcement layer 120 is made of a carbon fiber composite material which is a kind of reinforcing fiber.

For example, the reinforcement layer 120 may be made by winding a carbon fiber composite material around the outer surface (outer peripheral surface) of the liner 110 by using a typical winding device, and the carbon fiber composite material may be made by impregnating carbon fiber with epoxy, thermosetting resin, or the like.

The structure of the wound carbon fiber composite material and the method of winding the carbon fiber composite material may be variously changed in accordance with required conditions and design specifications. The present disclosure is not limited or restricted by the method of winding the carbon fiber composite material. For example, the reinforcement layer 120 may be made by winding multiple layers of the carbon fiber composite material around the outer surface of the liner 110 in various patterns (e.g., clockwise winding, counterclockwise winding, oblique winding, etc.).

According to another embodiment of the present disclosure, the reinforcement layer may be made by applying a process method such as filament winding, braiding, multi-filament winding, or the like using an intermediate material (prepreg, towpreg, etc.) made by impregnating reinforcing fiber (e.g., carbon fiber, fiberglass, aramid fiber, limestone fiber, etc.) with thermosetting or thermoplastic resin in advance and then partially curing the resin.

With reference to FIGS. 1 to 5, the boss 200 is integrally provided at the end of the liner 110 to define the inflow/outflow path 210 through which the target fluid is introduced or discharged. The guide hole 220 is provided in the boss 200 in the reference direction orthogonal to the longitudinal direction (Y-axis direction) of the pressure vessel 100.

Hereinafter, an example will be described in which the liner neck portion 114 extending from the end of the liner body portion 112 is provided to pass through the inside of the boss 200, and the inflow/outflow path 210 is defined along the inside of the liner neck portion 114.

The boss 200 may be made of various materials in accordance with required conditions and design specifications. The present disclosure is not restricted or limited by the material of the boss 200.

For example, the boss 200 may be made of an aluminum alloy (e.g., AL6060-T6).

According to an exemplary embodiment of the present disclosure, the boss 200 and the liner 110 may be integrated by insert-injection molding. For example, a temperature of the insert-injection molding for the boss 200 and the liner 110 may be 200 to 300° C. Alternatively, the liner 110 may be provided by blow molding, rotary molding, or other process methods.

The boss 200 may have various structures having the inflow/outflow path 210 and the guide hole 220. The present disclosure is not restricted or limited by the structure and shape of the boss 200.

For example, the boss 200 may include a boss body portion (not illustrated) provided to surround a periphery of a side surface of the liner neck portion 114 and a boss extension portion (not illustrated) extending from an end of the boss body portion and exposed (protruding) to the outside of the pressure vessel 100.

According to an exemplary embodiment of the present disclosure, a tool seat portion 240 may be provided on the boss 200 and may be configured to be fastened to a fastening tool.

The tool seat portion 240 may be configured to suppress a slip of the fastening tool (e.g., a wrench) and suppress a rotation of the boss 200 (e.g., a rotation of the boss caused by a rotation of a restriction member).

The tool seat portion 240 may have various structures capable of being fastened to a tool. The present disclosure is not restricted or limited by the structure of the tool seat portion 240 and the number of tool seat portions 240.

For example, the tool seat portion 240 may be configured by forming a plurality of flat surfaces on the outer peripheral surface of the boss 200. For example, the tool seat portion 240 may have an approximately quadrangular groove shape by removing (e.g., machining) a part of the outer peripheral surface of the boss 200.

The guide hole 220 may be formed through the boss 200 in the reference direction orthogonal to the longitudinal direction of the pressure vessel 100, and the manifold member 300 may be sliding-coupled to the guide hole 220.

In this case, the reference direction orthogonal to the longitudinal direction (Y-axis direction) of the pressure vessel 100 may be defined as a direction (X-axis direction) in which the plurality of pressure vessels 100 is arranged (stacked).

The guide hole 220 may have various structures in accordance with required conditions and design specifications. The present disclosure is not restricted or limited by the structure and shape of the guide hole 220.

For example, the guide hole 220 may have an approximately quadrangular cross-sectional shape. Alternatively, the guide hole 220 may have a circular cross-sectional shape or other cross-sectional shapes.

With reference to FIGS. 1 to 5, the manifold member 300 is configured to connect the plurality of pressure vessels 100 in parallel, and the manifold flow path 310 is provided along the inside of the manifold member 300.

More specifically, the manifold member 300 has the manifold flow path 310 configured to communicate with the inflow/outflow path 210, and the manifold member 300 is inserted into the guide hole 220 while penetrating the guide hole 220 in the reference direction (Y-axis direction).

The manifold member 300 may have various structures having the manifold flow path 310. The present disclosure is not restricted or limited by the structure and shape of the manifold member 300.

For example, the manifold member 300 may have a straight bar (or tube) shape having a cross-section (e.g., a quadrangular cross-section) corresponding to the guide hole 220. According to another embodiment of the present disclosure, the manifold member may have a curved shape or other shapes.

Hereinafter, an example will be described in which the manifold member 300 is made of a material (e.g., metal or synthetic resin) having rigidity. For example, the manifold member 300 may be made of at least any one of copper, aluminum, steel, stainless steel, and alloy steel.

According to another embodiment of the present disclosure, the manifold member may be made of an elastic material (e.g., rubber or urethane) having flexibility or made of a synthetic resin (polymer) material.

Further, the manifold member 300 may be manufactured by typical extrusion, pultrusion, machining, or the like.

The manifold flow path 310 may have various structures capable of being connected to and communicating with the inflow/outflow path 210 in the state in which the manifold member 300 is inserted into the guide hole 220. The present disclosure is not restricted or limited by the structure and shape of the manifold flow path 310.

According to an exemplary embodiment of the present disclosure, the manifold flow path 310 may include a first flow path 312 configured to communicate with the inflow/outflow path 210 and provided in the longitudinal direction (Y-axis direction) of the pressure vessel 100 and a second flow path 314 configured to communicate with the first flow path 312 and provided in the reference direction (the longitudinal direction of the manifold member) (X-axis direction).

For example, the first flow path 312 and the second flow path 314 may each have an approximately straight shape, and the first flow path 312 and the second flow path 314 may be connected to collectively define an approximately "T" shape. According to another embodiment of the present disclosure, the first flow path and the second flow path may be connected in an "L" shape or other shapes. Alternatively, the first flow path and the second flow path may each have a curved shape or other shapes.

The first flow path 312 and the second flow path 314 may have various cross-sectional shapes in accordance with required conditions and design specifications. The present disclosure is not restricted or limited by the cross-sectional shapes of the first flow path 312 and the second flow path 314.

According to an exemplary embodiment of the present disclosure, the first flow path 312 and the second flow path 314 may each have a circular cross-sectional shape.

According to another embodiment of the present disclosure, the first flow path and the second flow path may each have a quadrangular cross-sectional shape, a triangular cross-sectional shape, or other cross-sectional shapes. Alternatively, the first flow path and the second flow path may have different cross-sectional shapes.

The second flow path 314 may be formed through a part or the entirety of the manifold member 300 in the longitudinal direction (X-axis direction) of the manifold member 300.

That is, at least any one of two opposite ends of the second flow path 314 may be exposed to an end of the manifold member 300 based on the longitudinal direction of the manifold member 300. For example, the second flow path 314 may be formed through the entire manifold member 300 in the longitudinal direction of the manifold member 300, and the two opposite ends of the second flow path 314 may be respectively exposed to the two opposite ends of the manifold member 300 (the two opposite ends based on the longitudinal direction).

According to an exemplary embodiment of the present disclosure, the guide hole 220 may have a larger cross-sectional area than the manifold member 300.

In this case, the configuration in which the guide hole 220 has a larger cross-sectional area than the manifold member 300 may be defined as a configuration in which at least any one of a length of the guide hole 220 in the longitudinal direction (Y-axis direction) of the pressure vessel 100 and a length of the guide hole 220 in an upward/downward direction (Z-axis direction) is larger than a width and a height of the manifold member 300.

Hereinafter, an example will be described in which the guide hole 220 has a longer length (length in the Y-axis direction) than the manifold member 300 in the longitudinal direction of the pressure vessel 100.

Because the guide hole 220 has a larger cross-sectional area than the manifold member 300 as described above, it is possible to obtain an advantageous effect of ensuring that the manifold member 300 is smoothly inserted into the guide hole 220 and minimizing deformation of and damage to a first sealing member 510 caused by interference with the manifold member 300.

According to an exemplary embodiment of the present disclosure, the coupling device 10 for a pressure vessel may include the first sealing member 510 provided between the boss 200 and one surface of the manifold member 300 that faces the inflow/outflow path 210.

In particular, the first sealing member 510 may be interposed between the manifold member 300 and the liner flange portion 116 so as to be in surface contact with the manifold member 300 and the liner flange portion 116.

The first sealing member 510 may have various structures capable of sealing a gap between the manifold member 300 (the first flow path) and the inflow/outflow path 210. The present disclosure is not restricted or limited by the structure and shape of the first sealing member 510.

In particular, the first sealing member 510 may have a sealing surface (contact surface) flat in the reference direction (X-axis direction).

For example, the first sealing member 510 may have a flat ring shape having a diameter corresponding to the liner flange portion 116.

For example, the first sealing member 510 may be made of a typical elastic material such as rubber, silicone, or Teflon. The present disclosure is not restricted or limited by the material and structure of the first sealing member 510.

According to another embodiment of the present disclosure, a spring-energized seal, a metal gasket, or the like, which is made of a Teflon material, may be used as the first sealing member.

Figure 5:
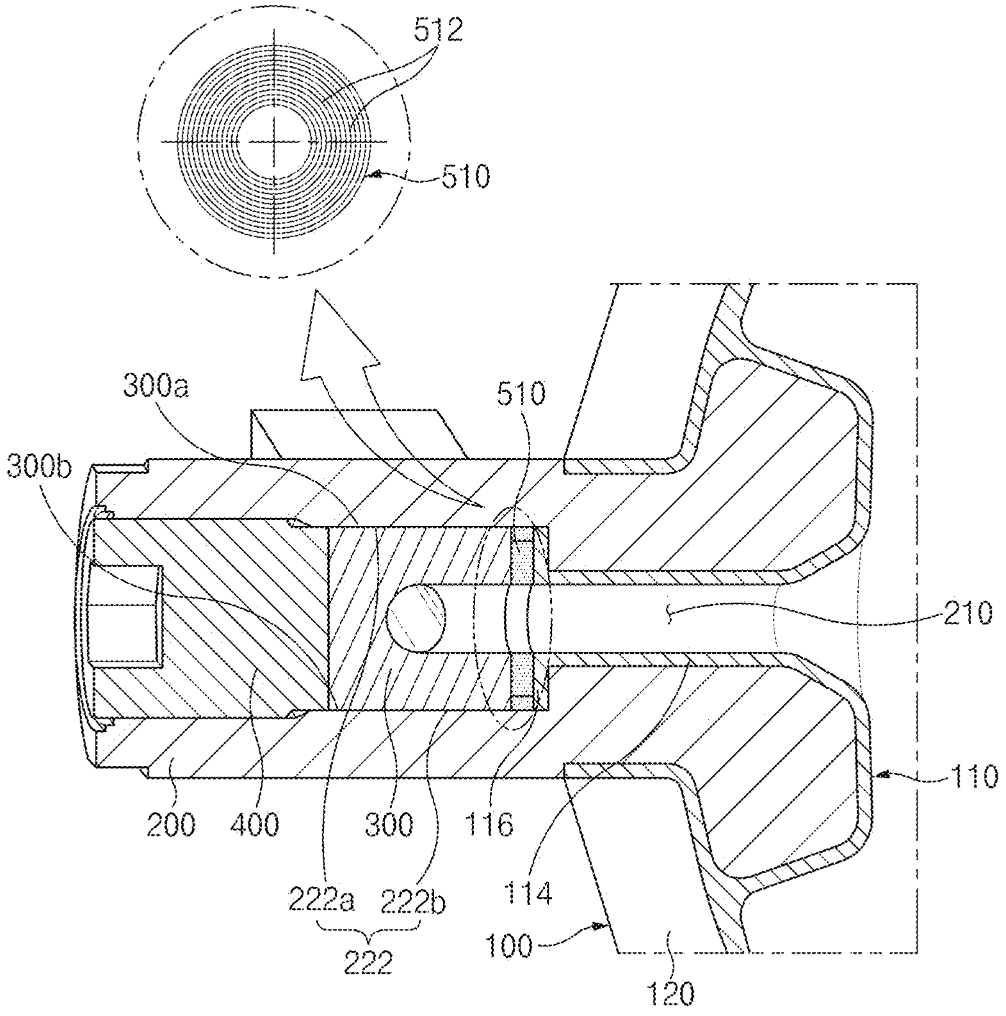
FIG. 5 is a view for explaining a first sealing member of the coupling device for a pressure vessel according to an embodiment of the present disclosure.

With reference to FIG. 5, in order to improve the sealing performance implemented by the first sealing member 510, sealing patterns 512 may be provided on at least any one of one surface and the other surface of the first sealing member 510, and each may have a closed-loop shape that surrounds a periphery of the inflow/outflow path 210.

The sealing pattern 512 may have various closed-loop shapes in accordance with required conditions and design specifications. The present disclosure is not restricted or limited by the structure and shape of the sealing pattern 512.

For example, the sealing pattern 512 may have an approximately circular ring shape. In particular, the plurality of sealing patterns 512 having different diameters may be coaxially provided on the first sealing member 510 based on the inflow/outflow path 210.

Because the sealing pattern 512 having a closed-loop shape is provided on the contact surface (sealing surface) of the first sealing member 510 as described above, it is possible to obtain an advantageous effect of stably ensuring the sealing performance implemented by the first sealing member 510 and minimizing a leak of the target fluid through the gap between the manifold member 300 and the inflow/outflow path 210.

According to another embodiment of the present disclosure, the sealing pattern provided on the first sealing member may have an open-loop shape such as a straight shape or a circular arc shape.

According to an exemplary embodiment of the present disclosure, the coupling device 10 for a pressure vessel may include a restriction member 400 configured to restrict a movement of the manifold member 300 relative to the boss 200 in the longitudinal direction of the pressure vessel 100.

The restriction member 400 is configured to restrict a movement of the manifold member 300 relative to the boss 200 in the longitudinal direction of the pressure vessel 100 by pressing the manifold member 300 (pressing the first sealing member) in a direction toward the pressure vessel 100.

The restriction member 400 may have various structures capable of restricting a movement of the manifold member 300 relative to the boss 200 in the longitudinal direction of the pressure vessel 100. The present disclosure is not restricted or limited by the type and structure of the restriction member 400.

According to an exemplary embodiment of the present disclosure, an accommodation portion 230 may be provided at the end of the boss 200 based on the longitudinal direction of the pressure vessel 100, and the restriction member 400 may be accommodated in the accommodation portion 230 so as to be able to press the manifold member 300.

The accommodation portion 230 may be provided at the end of the boss 200 and communicate with the guide hole 220. As the restriction member 400 is accommodated in the accommodation portion 230, a movement of the manifold member 300 relative to the boss 200 in the longitudinal direction of the pressure vessel 100 may be restricted.

In addition, when the restriction member 400 presses the manifold member 300, the first sealing member 510 interposed between the manifold member 300 and the boss 200 may be elastically compressed and more effectively seal the gap between the manifold member 300 and the inflow/outflow path 210.

The restriction implemented by the restriction member 400 relative to the boss 200 may be implemented in various ways in accordance with required conditions and design specifications.

According to an exemplary embodiment of the present disclosure, the coupling device 10 for a pressure vessel may include a first screw thread portion 232 formed on an inner peripheral surface of the accommodation portion 230 and a second screw thread portion 402 formed on an outer peripheral surface of the restriction member 400 and configured to engage with the first screw thread portion 232. The restriction member 400 may restrict the manifold member 300 using a fastening force between the first screw thread portion 232 and the second screw thread portion 402.

For example, the first screw thread portion 232 may be provided in an internal thread shape, and the second screw thread portion 402 may be provided in an external thread shape. When the second screw thread portion 402 is fastened to the first screw thread portion 232, an arrangement state of the restriction member 400 with respect to the boss 200 (the state in which the manifold member 300 is pressed) may be securely maintained.

According to another embodiment of the present disclosure, the first screw thread portion may be provided in an external thread shape, and the second screw thread portion may be provided in an internal thread shape.

Figure 6:
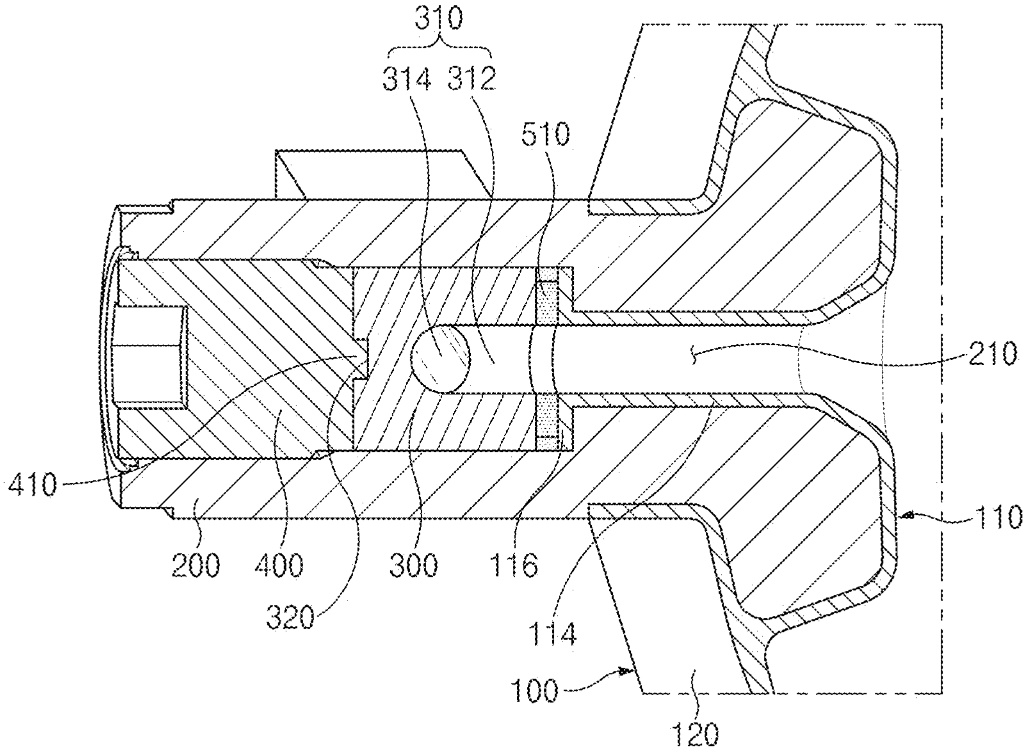
FIG. 6 is a view for explaining a guide protrusion and a guide groove of the coupling device for a pressure vessel according to an embodiment of the present disclosure.

With reference to FIG. 6, according to an exemplary embodiment of the present disclosure, the coupling device 10 for a pressure vessel may include a guide protrusion 410 provided on one surface of the restriction member 400 that faces the manifold member 300 and a guide groove 320 provided in the manifold member 300 and configured to accommodate the guide protrusion 410.

The guide protrusion 410 and the guide groove 320 are configured to restrict a movement of the manifold member 300 relative to the boss 200 in the longitudinal direction (X-axis direction) of the manifold member 300.

The guide protrusion 410 and the guide groove 320 may have various structures in accordance with required conditions and design specifications. The present disclosure is not restricted or limited by the structures and shapes of the guide protrusion 410 and the guide groove 320.

For example, the guide protrusion 410 may have an approximately cylindrical shape having a circular cross-section, and the guide groove 320 may have a circular groove shape corresponding to the guide protrusion 410. According to another embodiment of the present disclosure, the guide protrusion may have a wedge shape, a conical shape, or other shapes.

According to an exemplary embodiment of the present disclosure, the guide protrusion 410 may be provided in an axial direction of the pressure vessel 100 (the longitudinal direction of the pressure vessel) (Y-axis direction).

As described above, in an embodiment of the present disclosure, the guide protrusion 410 is provided in the axial direction of the pressure vessel 100 (provided on the same line as an axis of the pressure vessel 100), such that the first flow path 312 may be aligned (consistent) with the inflow/outflow path 210 at the same time that the guide protrusion 410 is accommodated in the guide groove 320.

According to an exemplary embodiment of the present disclosure, the coupling device 10 for a pressure vessel may include a restriction portion 222 provided in the guide hole 220 to restrict a movement of the manifold member 300 relative to the boss 200 in the upward/downward direction (Z-axis direction) orthogonal to the longitudinal direction (Y-axis direction) of the pressure vessel 100.

The restriction portion 222 may have various structures capable of restricting a movement of the manifold member 300 relative to the boss 200 in the upward/downward direction. The present disclosure is not restricted or limited by the structure of the restriction portion 222.

According to an exemplary embodiment of the present disclosure, the restriction portion 222 may include a first guide surface **222*a* configured to define one wall surface (e.g., an upper wall surface based on FIG. 5) of the guide hole 220 and a second guide surface 222*b* provided to face the first guide surface 222*a* and configured to define the other wall surface (e.g., a lower wall surface based on FIG. 5) of the guide hole 220. The manifold member 300 may be supported between the first guide surface 222*a* and the second guide surface 222*b* so as to be rectilinearly movable in the longitudinal direction (Y-axis direction) of the pressure vessel 100**.

In particular, at least one of the first guide surface **222*a* and the second guide surface 222*b* may be defined as a flat surface. Hereinafter, an example will be described in which both the first guide surface 222*a* and the second guide surface 222*b*** are defined as flat surfaces.

More particularly, the manifold member 300 may include a first flat portion **300*a* provided to be in surface contact with the first guide surface 222*a* and a second flat portion 300*b* provided to be in surface contact with the second guide surface 222*b***.

In an embodiment of the present disclosure illustrated and described above, the example has been described in which the first flat portion **300*a* is provided at one end of the manifold member 300, and the second flat portion 300*b* is provided at the other end of the manifold member 300**. However, according to another embodiment of the present disclosure, the first flat portion may be provided at one end of the manifold member, and a curved surface portion having a curved shape (e.g., a circular arc shape), instead of a flat portion, may be provided at the other end of the manifold member.

In addition, in the embodiment of the present disclosure illustrated and described above, the example has been described in which the inner wall surface of the guide hole 220 defines the restriction portion 222. However, according to another embodiment of the present disclosure, a movement of the manifold member relative to the boss in the upward/downward direction may be restricted by using a separate restriction means provided independently of the boss.

As described above, in an embodiment of the present disclosure, the manifold member 300 is sliding-coupled to the guide hole 220 provided in the boss 200, such that it is not necessary to directly rotate and fasten the pressure vessel 100 having a long length. Therefore, it is possible to simplify the process of fastening the pressure vessel 100 and more easily perform the process of fastening the pressure vessel 100.

In addition, according to an embodiment of the present disclosure, because the pressure vessel 100 (the boss or the liner) and the manifold member 300 are in surface contact with each other, it is possible to obtain an advantageous effect of minimizing the number of sealing points (leak points) between the coupling device and the pressure vessel 100. That is, in an embodiment of the present disclosure, the sealing point (leak point) between the manifold member 300 and the pressure vessel 100 is present only at a boundary between the inflow/outflow path 210 and the first flow path 312 at which the boss 200 (or the liner) and the manifold member 300 are in surface contact with each other (only a single sealing point is present). Therefore, it is possible to obtain an advantageous effect of minimizing a leak of the target fluid and simplifying the structure for sealing the connection portion between the manifold member 300 and the pressure vessel 100.

In addition, according to an embodiment of the present disclosure, a movement of the manifold member 300 relative to the boss 200 in the longitudinal direction (Y-axis direction) of the pressure vessel 100 and a movement of the manifold member 300 relative to the boss 200 in the upward/downward direction (Z-axis direction) are restricted by the restriction member 400 and the restriction portion 222. Therefore, it is possible to obtain an advantageous effect of more easily aligning the posture of the manifold member 300 with respect to the boss 200 and stably maintaining the arrangement state of the pressure vessel 100 without a separate support device for supporting the pressure vessel 100. Further, it is possible to obtain an advantageous effect of ensuring the straightness between the pressure vessels 100 (the state in which the pressure vessels 100 are disposed in parallel).

Moreover, according to an embodiment of the present disclosure, the contact surface (sealing surface) with which the manifold member 300 is in contact with respect to the boss 200 is defined as a flat surface. In other words, the first sealing member 510 is provided between the boss 200 and the manifold member 300 and provided to be in surface contact with the boss 200 and the manifold member 300. Therefore, it is possible to obtain an advantageous effect of stably maintaining the sealability even though a degree of alignment of the manifold member 300 with respect to the boss 200 in the reference direction (the longitudinal direction of the manifold member 300) (X-axis direction) is finely misaligned.

Figure 9:
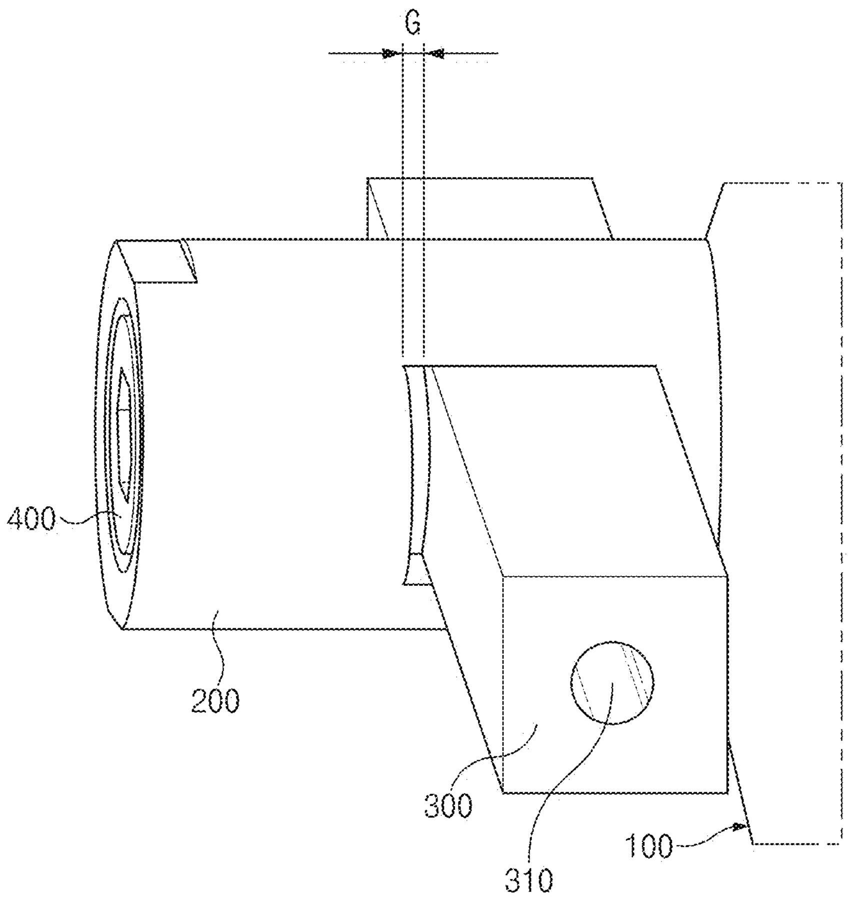
FIGS. 9 and 10 are views for explaining a blocking member of the coupling device for a pressure vessel according to an embodiment of the present disclosure.
Figure 10:
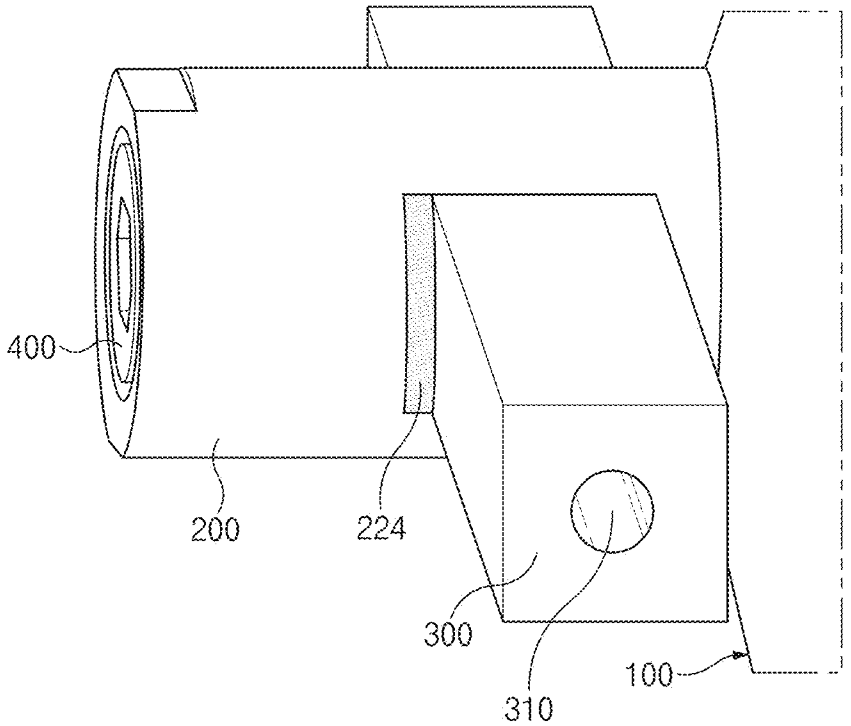

Meanwhile, with reference to FIGS. 9 and 10, according to an exemplary embodiment of the present disclosure, the coupling device 10 for a pressure vessel may include a blocking member 224 configured to block a gap G between the guide hole 220 and the manifold member 300 in the longitudinal direction of the pressure vessel 100.

Because the guide hole 220 has a longer length (length in the Y-axis direction) than the manifold member 300 in the longitudinal direction of the pressure vessel 100, it is possible to ensure that the manifold member 300 is smoothly inserted (slides) into the guide hole 220. However, because the guide hole 220 has a longer length (length in the Y-axis direction) than the manifold member 300, the gap G may be formed between the guide hole 220 and the manifold member 300 in the state in which the restriction member 400 presses the manifold member 300, and the end of the restriction member 400, which is exposed through the gap G, may be contaminated or damaged (corroded) by foreign substances and the like introduced into the gap G.

In contrast, in an embodiment of the present disclosure, the gap between the guide hole 220 and the manifold member 300 is blocked by the blocking member 224. Therefore, it is possible to obtain an advantageous effect of minimizing contamination of and damage to the restriction member 400 exposed through the gap G.

The blocking member 224 may have various structures capable of blocking the gap between the guide hole 220 and the manifold member 300. The present disclosure is not restricted or limited by the structure and shape of the blocking member 224.

For example, the blocking member 224 may have a shape (e.g., a band shape having an arc-shaped cross-section) corresponding to the gap G and may be inserted into the gap. According to another embodiment of the present disclosure, the blocking member may be configured to surround the entire outer peripheral surface of the boss while covering the gap.

The blocking member 224 may be made of a typical material such as polymer or metal. The present disclosure is not restricted or limited by the material and properties of the blocking member 224.

In the embodiment of the present disclosure illustrated and described above, an example is described in which a fastening member, such as a plug or a fastening bolt, is used as the restriction member 400. According to another embodiment of the present disclosure, various types of finishing members or various types of additional devices, such as a valve for adjusting or controlling a discharge of the target fluid (e.g., hydrogen) stored in the pressure vessel 100, may be used as a restriction member 400' configured to restrict a movement of the manifold member 300 relative to the boss 200 in the longitudinal direction of the pressure vessel 100.

Figure 7:
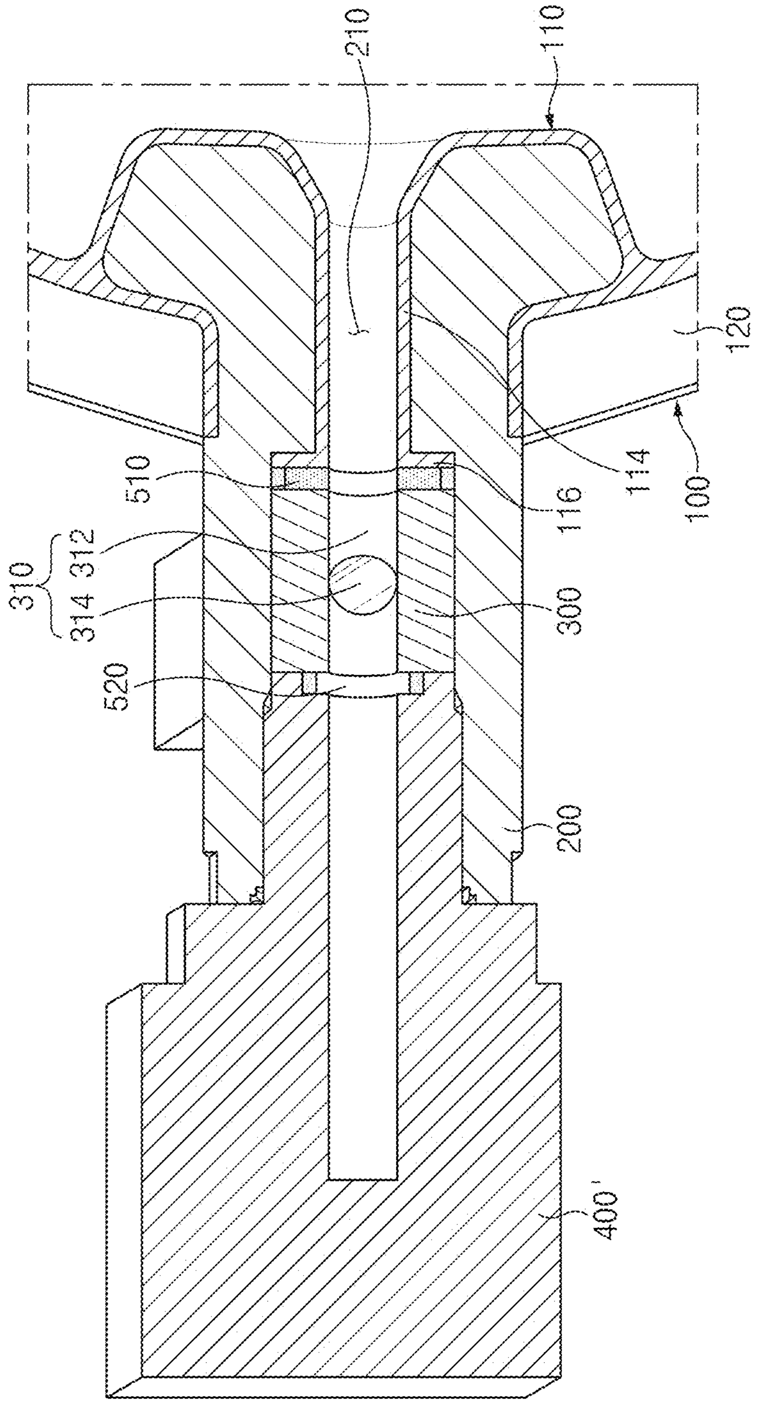
FIG. 7 is a view for explaining a second sealing member of the coupling device for a pressure vessel according to an embodiment of the present disclosure.

For example, with reference to FIG. 7, the first flow path 312 may be formed through the manifold member 300 in the longitudinal direction (Y-axis direction) of the pressure vessel 100, and the restriction member 400' may be connected to the boss 200 and communicate with the first flow path 312.

For example, a temperature-sensitive safety valve (thermal pressure relief device (TPRD)) may be used as the restriction member 400'. According to another embodiment of the present disclosure, a manual valve, a shut-off valve, or the like may be used as the restriction member 400'.

The restriction member 400' may be mounted directly in the accommodation portion 230 of the manifold member 300 (e.g., in a screw-fastening manner) without using a separate tube or an adapter member.

Meanwhile, in the embodiment of the present disclosure illustrated and described above, the example has been described in which various types of additional devices, such as a valve for adjusting or controlling a discharge of the target fluid (e.g., hydrogen) stored in the pressure vessel 100, are used as the restriction member 400. However, according to another embodiment of the present disclosure, various types of additional devices (restriction members), such as a valve, may be used as a finishing member configured to finish (block) the end of the second flow path.

With reference to FIG. 7, according to an exemplary embodiment of the present disclosure, the coupling device 10 for a pressure vessel may include a second sealing member 520 provided between the manifold member 300 and the restriction member 400.

In particular, the second sealing member 520 may be interposed between the manifold member 300 and the restriction member 400 so as to be in surface contact with the manifold member 300 and the restriction member 400.

The second sealing member 520 may have various structures capable of sealing a gap between the manifold member 300 (the first flow path) and the restriction member 400. The present disclosure is not restricted or limited by the structure and shape of the second sealing member 520.

In particular, the second sealing member 520 may have a sealing surface (contact surface) flat in the reference direction (X-axis direction).

For example, the second sealing member 520 may have a flat ring shape having a diameter corresponding to the restriction member 400.

For example, the second sealing member 520 may be made of a typical elastic material such as rubber, silicone, or Teflon. The present disclosure is not restricted or limited by the material and structure of the second sealing member 520.

According to another embodiment of the present disclosure, a spring-energized seal, a metal gasket, or the like, which is made of a Teflon material, may be used as the second sealing member.

As described above, in an embodiment of the present disclosure, the second sealing member 520 is provided between the manifold member 300 and the restriction member 400, and the second sealing member 520 is pressed when the restriction member 400 is fastened to the boss 200. Therefore, it is possible to obtain an advantageous effect of stably ensuring the sealing performance implemented by the second sealing member 520 and minimizing a leak of the target fluid through the gap between the manifold member 300 and the restriction member 400.

In the embodiment of the present disclosure illustrated and described above, the example has been described in which the liner 110, which constitutes the pressure vessel 100, includes the liner body portion 112, the liner neck portion 114, and the liner flange portion 116. However, according to another embodiment of the present disclosure, the liner 110 may include only the liner body portion 112 and the liner neck portion 114 without the liner flange portion 116.

Figure 8:
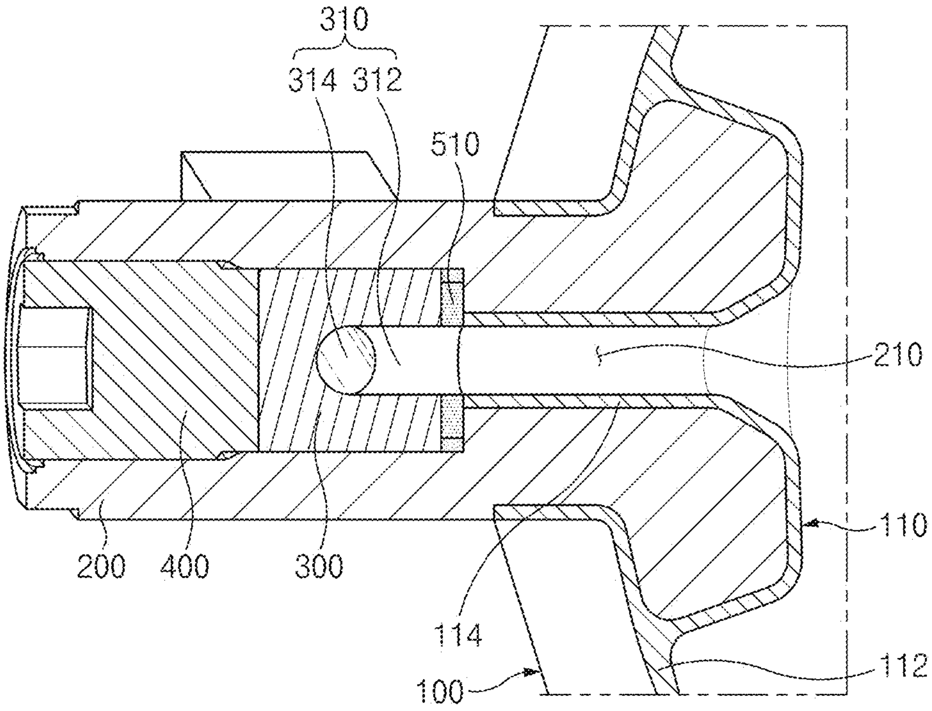
FIG. 8 is a view for explaining a modified example of a liner of the coupling device for a pressure vessel according to an embodiment of the present disclosure.

With reference to FIG. 8, according to an exemplary embodiment of the present disclosure, the coupling device 10 for a pressure vessel may include the boss 200 provided at the end of the pressure vessel 100 configured to store the target fluid, the boss 200 having the inflow/outflow path 210 through which the target fluid is introduced or discharged and the guide hole 220 provided in the reference direction orthogonal to the longitudinal direction of the pressure vessel 100, and the manifold member 300 configured to be inserted into the guide hole 220 in the reference direction and having the manifold flow path 310 configured to communicate with the inflow/outflow path 210. The liner 110, which constitutes the pressure vessel 100, may include the liner body portion 112 configured to store the target fluid and the liner neck portion 114 extending from the end of the liner body portion 112. The inflow/outflow path 210 may be defined along the inside of the liner neck portion 114.

With this structure, the end of the liner neck portion 114 may be in direct contact with one surface of the first sealing member 510, an edge portion of the first sealing member 510, which is disposed at an outer periphery of the liner neck portion 114, may be supported to be in surface contact with one surface of the boss 200 (an inner surface of the boss that faces the manifold member).

According to still another embodiment of the present disclosure, a liner 110' may include only a liner body portion 112' without including a separate liner neck portion and a separate liner flange portion.

Figure 12:
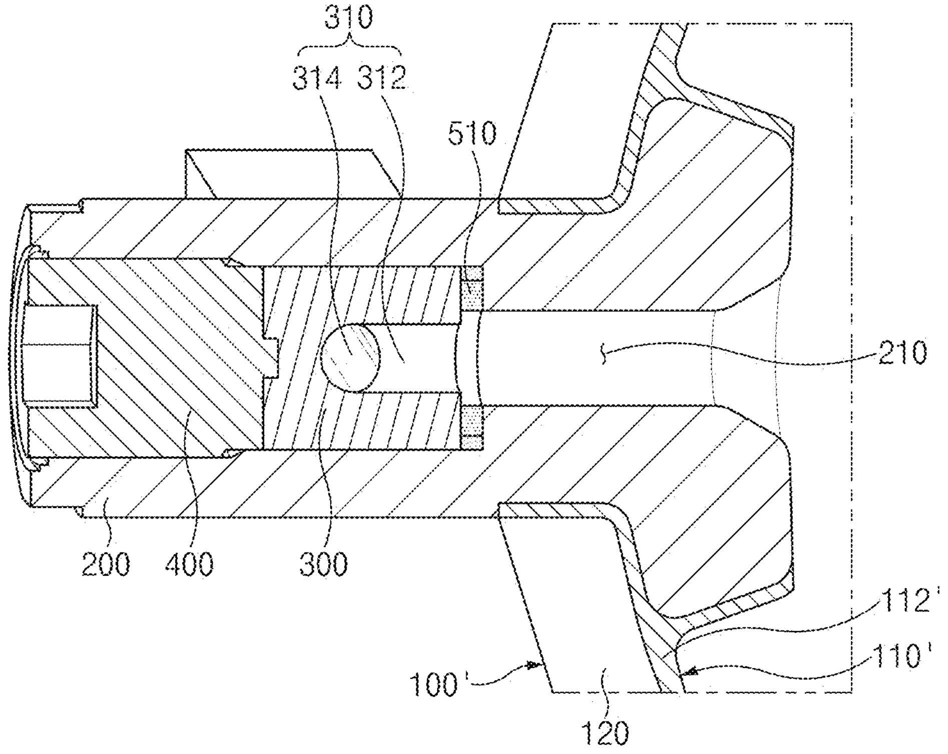
FIG. 12 is a view for explaining another modified example of the liner of the coupling device for a pressure vessel according to an embodiment of the present disclosure.

With reference to FIG. 12, according to an exemplary embodiment of the present disclosure, the coupling device 10 for a pressure vessel may include the boss 200 provided at an end of a pressure vessel 100' configured to store the target fluid, the boss 200 having the inflow/outflow path 210 through which the target fluid is introduced or discharged and the guide hole 220 provided in the reference direction orthogonal to the longitudinal direction of the pressure vessel 100', and the manifold member 300 configured to be inserted into the guide hole 220 in the reference direction and having the manifold flow path 310 configured to communicate with the inflow/outflow path 210. The liner 110', which constitutes the pressure vessel 100', may include the liner body portion 112' configured to store the target fluid, and the inflow/outflow path 210 may communicate with the end of the liner body portion 112.

With this structure, the first sealing member 510 may be interposed between the manifold member 300 and one surface of the boss 200 that faces the manifold member 300.

Meanwhile, in an embodiment of the present disclosure illustrated and described above, the example has been described in which the gap between the boss 200 and the manifold member 300 is sealed by the first sealing member 510. However, according to another embodiment of the present disclosure, the gap between the boss 200 and the manifold member 300 may be sealed by a bonding layer 530.

Figure 11:
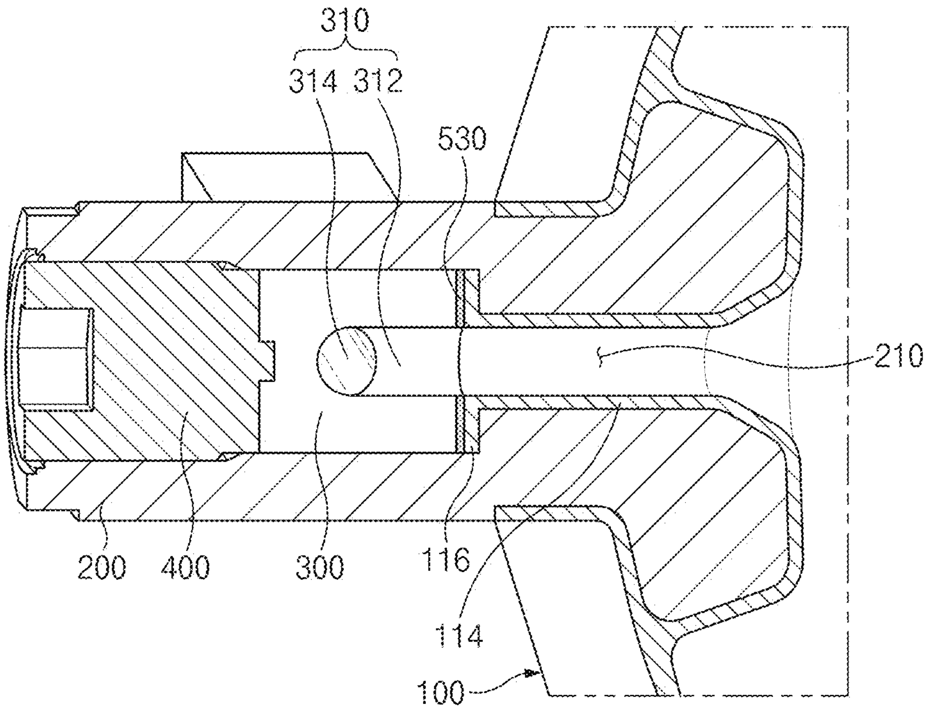
FIG. 11 is a view for explaining a bonding layer of the coupling device for a pressure vessel according to an embodiment of the present disclosure.

With reference to FIG. 11, according to an exemplary embodiment of the present disclosure, the coupling device 10 for a pressure vessel may include the boss 200 provided at the end of the pressure vessel 100 configured to store the target fluid, the boss 200 having the inflow/outflow path 210 through which the target fluid is introduced or discharged and the guide hole 220 provided in the reference direction orthogonal to the longitudinal direction of the pressure vessel 100, the manifold member 300 configured to be inserted into the guide hole 220 in the reference direction and having the manifold flow path 310 configured to communicate with the inflow/outflow path 210, and the bonding layer 530 provided between the boss 200 and one surface of the manifold member 300 that faces the inflow/outflow path 210.

For example, the bonding layer 530 may be provided between the liner flange portion 116 and the manifold member 300.

The bonding layer 530 may serve to seal the gap between the boss 200 and the manifold member 300 and fix the manifold member 300 to the boss 200.

The bonding layer 530 may be provided by applying a typical bonding agent (e.g., a synthetic resin bonding agent). The present disclosure is not restricted or limited by the type and properties of the bonding agent.

For reference, in the embodiment of the present disclosure illustrated and described above, the example has been described in which the bonding layer 530, instead of the first sealing member 510, is provided in the gap between the boss 200 and the manifold member 300. However, according to another embodiment of the present disclosure, both the first sealing member 510 and the bonding layer 530 may be provided in the gap between the boss 200 and the manifold member 300.

In addition, according to an exemplary embodiment of the present disclosure, a lubrication layer (not illustrated), together with the first sealing member 510 (and/or the bonding layer), may be provided in the gap between the boss 200 and the manifold member 300.

The lubrication layer may be provided by applying a typical lubricant such as grease. The present disclosure is not restricted or limited by the type and properties of the lubricant.

Because the lubrication layer is provided in the gap between the boss 200 and the manifold member 300 as described above, it is possible to obtain an advantageous effect of improving the sealing performance implemented by the first sealing member 510 and minimizing deformation of and damage to the first sealing member 510 caused by contact (friction) between the manifold member 300 and the first sealing member 510.

In addition, a lubrication layer (not illustrated) may also be provided between the manifold member 300 and the restriction member 400.

Because the lubrication layer is provided between the manifold member 300 and the restriction member 400 as described above, it is possible to obtain an advantageous effect of minimizing a loss of torque (fastening force) caused by contact between the restriction member 400 and the manifold member 300 (friction caused by the rotation of the restriction member 400). Further, it is possible to obtain an advantageous effect of minimizing deformation of and damage to the manifold member 300 caused by contact (friction) between the restriction member 400 and the manifold member 300.

According to the embodiments of the present disclosure described above, it is possible to obtain an advantageous effect of improving the safety and reliability and simplifying the process of fastening the pressure vessel.

In particular, according to the embodiments of the present disclosure, it is possible to obtain an advantageous effect of minimizing the number of sealing points (leak points) between the coupling device and the pressure vessel while simplifying the structure and the fastening process.

In addition, according to the embodiments of the present disclosure, it is possible to fasten the pressure vessel and the coupling device without rotating the pressure vessel relative to the coupling device.

Among other things, according to the embodiments of the present disclosure, the manifold member is sliding-coupled to the guide hole provided in the boss, such that the plurality of pressure vessels may be connected in parallel, which may facilitate the process of fastening the pressure vessel.

In addition, according to the embodiments of the present disclosure, it is possible to obtain an advantageous effect of stably maintaining the arrangement state and fastened state of the pressure vessel and improving the structural safety.

In addition, according to the embodiments of the present disclosure, it is possible to obtain an advantageous effect of minimizing the fastening size between the pressure vessel and the coupling device and improving the spatial utilization and the degree of design freedom.

In addition, according to the embodiments of the present disclosure, it is possible to obtain an advantageous effect of minimizing the loosening and withdrawal of the coupling device caused by vibration, impact, and the like.

While the embodiments have been described above, the embodiments are just illustrative and not intended to limit the present disclosure. It can be appreciated by those skilled in the art that various modifications and applications, which are not described above, may be made to the present embodiments without departing from the intrinsic features of the present embodiments. For example, the respective constituent elements specifically described in the embodiments may be modified and then carried out. Further, it should be interpreted that the differences related to the modifications and applications are included in the scope of the present disclosure defined by the appended claims.

What is claimed is:

1. A coupling device comprising:
- a boss disposed at an end of a pressure vessel that is configured to store a target fluid, the boss comprising an inflow/outflow path through which the target fluid is introducible or dischargeable and a guide hole disposed in a reference direction orthogonal to a longitudinal direction of the pressure vessel;
- a manifold member insertable into the guide hole in the reference direction and comprising a manifold flow path configured to communicate with the inflow/outflow path wherein a length of the guide hole is greater than a length of the manifold member in the longitudinal direction;
- a first sealing member disposable between the boss and a surface of the manifold member that faces the inflow/outflow path,
- wherein the first sealing member is configured to be in surface contact with the boss and the surface of the manifold member; and
- a blocking member being band shaped and having an arc-shaped cross-section, wherein the blocking member is configured to block a gap between the guide hole and the manifold member in the longitudinal direction.

2. The coupling device of claim 1, wherein the manifold flow path comprises:
- a first flow path configured to communicate with the inflow/outflow path and disposed in the longitudinal direction; and
- a second flow path configured to communicate with the first flow path and disposed in the reference direction.

3. The coupling device of claim 2, wherein a first end of two opposite ends of the second flow path is exposed to an end of the manifold member based on a longitudinal direction of the manifold member.

4. The coupling device of claim 1, further comprising a restriction portion configured to restrict a movement of the manifold member relative to the boss in an upward/downward direction orthogonal to the longitudinal direction of the pressure vessel.

5. The coupling device of claim 4, wherein:
- the restriction portion comprises:
  - a first guide surface defining a first wall surface of the guide hole; and
  - a second guide surface facing the first guide surface and defining a second wall surface of the guide hole; and
- the manifold member is supported between the first guide surface and the second guide surface.

6. The coupling device of claim 5, wherein the first guide surface, the second guide surface, or both the first guide surface and the second guide surface is a flat surface.

7. The coupling device of claim 6, wherein the manifold member comprises:
- a first flat portion disposed in surface contact with the first guide surface; and
- a second flat portion is in surface contact with the second guide surface.

8. The coupling device of claim 1, wherein the first sealing member comprises a sealing pattern having a closed-loop shape that surrounds a periphery of the inflow/outflow path.

9. The coupling device of claim 1, further comprising a bonding layer disposed between the boss and the surface of the manifold member that faces the inflow/outflow path.

10. The coupling device of claim 1, further comprising a restriction member configured to restrict a movement of the manifold member relative to the boss in the longitudinal direction.

11. The coupling device of claim 1, wherein the blocking member comprises a metal.

12. The coupling device of claim 1, wherein the blocking member comprises a polymer.

13. A coupling device comprising:
- a boss disposed at an end of a pressure vessel that is configured to store a target fluid, the boss comprising an inflow/outflow path through which the target fluid is introducible or dischargeable and a guide hole disposed in a reference direction orthogonal to a longitudinal direction of the pressure vessel;
- a manifold member removably arranged in the guide hole in the reference direction and comprising a manifold flow path communicating with the inflow/outflow path, wherein a length of the guide hole is greater than a length of the manifold member in the longitudinal direction;
- a first sealing member disposed between the boss and a surface of the manifold member that faces the inflow/outflow path, wherein the first sealing member is in surface contact with the boss and the surface of the manifold member;
- a restriction member configured to restrict a movement of the manifold member relative to the boss in the longitudinal direction of the pressure vessel; and
- a blocking member being band shaped and having an arc-shaped cross-section, wherein the blocking member blocks a gap between the guide hole and the manifold member in the longitudinal direction.

14. The coupling device of claim 13, further comprising an accommodation portion disposed at an end of the boss based on the longitudinal direction of the pressure vessel, wherein the restriction member is accommodated in the accommodation portion and configured to press the manifold member.

15. The coupling device of claim 14, further comprising:

a first screw thread portion disposed on an inner peripheral surface of the accommodation portion; and a second screw thread portion disposed on an outer peripheral surface of the restriction member and configured to engage with the first screw thread portion, wherein the restriction member is configured to restrict the manifold member using a fastening force between the first screw thread portion and the second screw thread portion.

16. The coupling device of claim 13, further comprising:

a guide protrusion disposed on a surface of the restriction member that faces the manifold member; and a guide groove disposed in the manifold member and configured to accommodate the guide protrusion, wherein the guide protrusion is disposed in an axial direction of the pressure vessel.

17. The coupling device of claim 13, further comprising a second sealing member disposed between the manifold member and the restriction member.

18. A coupling device comprising:

a boss disposed at an end of a pressure vessel, wherein the pressure vessel comprises a liner configured to store a target fluid, wherein the boss is disposed at an end of the liner, and wherein the boss comprises an inflow/outflow path through which the target fluid is introducible or dischargeable and a guide hole disposed in a reference direction orthogonal to a longitudinal direction of the pressure vessel;

a manifold member insertable into the guide hole in the reference direction and comprising a manifold flow path configured to communicate with the inflow/outflow path, wherein a length of the guide hole is greater than a length of the manifold member in the longitudinal direction;

a first sealing member disposable between the boss and a surface of the manifold member that faces the inflow/outflow path, wherein the first sealing member is configured to be in surface contact with the boss and the surface of the manifold member; and a blocking member being band shaped and having an arc-shaped cross-section, wherein the blocking member is configured to block a gap between the guide hole and the manifold member in the longitudinal direction.

19. The coupling device of claim 18, wherein:

the liner comprises:

a liner body portion configured to store the target fluid; and a liner neck portion extending from an end of the liner body portion; and the inflow/outflow path is defined along an inside of the liner neck portion.

20. The coupling device of claim 19, further comprising a liner flange portion disposed at an end of the liner neck portion and having a cross-sectional area that is greater than a cross-sectional area of the liner neck portion, wherein the manifold member is in close contact with the liner flange portion.

* * * * *